(12) United States Patent
Saito et al.

(10) Patent No.: US 8,067,118 B2
(45) Date of Patent: Nov. 29, 2011

(54) NONAQUEOUS ELECTROLYTE SECONDARY BATTERY AND METHOD OF MANUFACTURING THE SAME

(75) Inventors: Motoharu Saito, Hyogo (JP); Hideyuki Koga, Shizuoka (JP); Katsutoshi Takeda, Tokushima (JP); Hiroshi Sawada, Aichi (JP); Masahisa Fujimoto, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 352 days.

(21) Appl. No.: 12/518,513

(22) PCT Filed: Dec. 26, 2007

(86) PCT No.: PCT/JP2007/075023
§ 371 (c)(1),
(2), (4) Date: Jun. 10, 2009

(87) PCT Pub. No.: WO2008/081839
PCT Pub. Date: Jul. 10, 2008

(65) Prior Publication Data
US 2010/0104944 A1    Apr. 29, 2010

(30) Foreign Application Priority Data

Dec. 27, 2006  (JP) ................................. 2006-351455

(51) Int. Cl.
*H01M 4/13*    (2010.01)
*H01M 4/00*    (2006.01)
*H01M 4/58*    (2010.01)
*H01M 4/50*    (2010.01)

(52) U.S. Cl. .................. 429/231.95; 429/223; 429/224; 429/231.9; 429/218.1

(58) Field of Classification Search ............. 429/231.95, 429/223, 224, 231.9, 218.1
See application file for complete search history.

(56) References Cited

U.S. PATENT DOCUMENTS 6,268,085 B1    7/2001    Manthiram et al. .......... 429/224
(Continued)

FOREIGN PATENT DOCUMENTS

EP    1 981 102 A1    10/2008
(Continued)

OTHER PUBLICATIONS

Balsys, Ronald J., et al., "The structure of $Li_{0.43}Na_{0.36}CoO_{1.96}$ using neutron powder diffraction ," Solid State Ionics, North Holland Pub. Co., Amsterdam, NL., 1994, vol. 69, No. 1, pp. 69-74, XP25754247.

(Continued)

*Primary Examiner* — Helen O Conley
(74) *Attorney, Agent, or Firm* — Kratz, Quintos & Hanson, LLP (57) ABSTRACT

A mixed positive electrode active material is used. The mixed positive electrode active material is obtained by mixing a layered oxide whose initial charge-discharge efficiency when lithium metal is used for a counter electrode is less than 100% (hereinafter referred to as a first layered oxide) and a layered oxide whose initial charge-discharge efficiency is 100% or more (hereinafter referred to as a second layered oxide). Examples of the first layered oxide include $Li_{1+a}Mn_xCo_yNi_zO_2$. A sodium oxide such as $Li_ANa_BMn_XCo_YNi_ZO_2$ other than a layered compound from which lithium is previously extracted by acid treatment or the like can be used as the second layered oxide whose initial charge-discharge efficiency is 100% or more. A layered oxide obtained by replacing (ion exchange) sodium in the foregoing $Li_ANa_BMn_XCo_YNi_ZO_2$ with lithium can be also used as the second layered oxide.

10 Claims, 7 Drawing Sheets

U.S. PATENT DOCUMENTS

| | | |
|---|---|---|
| 6,306,542 B1 | 10/2001 | Nakano |
| 2002/0098146 A1 | 7/2002 | Takada |
| 2004/0197654 A1 | 10/2004 | Barker et al. .............. 429/218.1 |
| 2005/0266315 A1 | 12/2005 | Sato |
| 2006/0194109 A1 | 8/2006 | Watanabe |
| 2006/0194112 A1 | 8/2006 | Barker et al. .............. 429/231.9 |
| 2007/0141468 A1 | 6/2007 | Barker ....................... 429/231.1 |
| 2010/0266899 A1 | 10/2010 | Barker et al. ................. 429/221 |

FOREIGN PATENT DOCUMENTS

| | | |
|---|---|---|
| JP | 2000-203844 | 7/2000 |
| JP | 2002-220231 A1 | 8/2002 |
| JP | 2004-31165 A1 | 1/2004 |
| JP | 2004-342500 A1 | 12/2004 |
| JP | 2005-78985 | 3/2005 |
| JP | 2005-339970 A1 | 12/2005 |
| JP | 2007-42302 A1 | 2/2007 |
| JP | 2007-103187 A1 | 4/2007 |
| JP | 2007-220650 A1 | 8/2007 |
| JP | 2007-273224 A1 | 10/2007 |
| JP | 2008-16267 A1 | 1/2008 |
| WO | WO 99/50924 A1 | 10/1999 |

OTHER PUBLICATIONS

Supplementary European Search Report dated Dec. 20, 2010.
International Search Report for International Application No. PCT/JP2007/075023 dated Apr. 1, 2008.

FIG. 11

NONAQUEOUS ELECTROLYTE SECONDARY BATTERY AND METHOD OF MANUFACTURING THE SAME

TECHNICAL FIELD

The present invention relates to a nonaqueous electrolyte secondary battery including a positive electrode, a negative electrode, and a non-aqueous electrolyte and a method of manufacturing the same.

BACKGROUND ART

Nonaqueous electrolyte secondary batteries employing nonaqueous electrolytes are widely utilized today as secondary batteries with high energy density. In a nonaqueous electrolyte secondary battery, for example, transfer of lithium ions between a positive electrode and a negative electrode causes charges and discharges.

In general, a lithium transition metal composite oxide having a layered structure such as lithium-nickel oxide ($LiNiO_2$), lithium-cobalt oxide ($LiCoO_2$), or $LiNi_{1/3}Co_{1/3}Mn_{1/3}O_2$ is employed as the positive electrode, and a carbon material capable of storing and releasing lithium, a lithium metal, a lithium alloy or the like is employed as the negative electrode in such a nonaqueous electrolyte secondary battery.

The nonaqueous electrolyte produced by dissolving electrolyte salt such as lithium tetrafluoroborate ($LiBF_4$) or lithium hexafluorophosphate ($LiPF_6$) in an organic solvent such as ethylene carbonate or diethyl carbonate is used.

While such nonaqueous electrolyte secondary batteries have recently been used as power sources for mobile equipment and so on, it is desired to develop nonaqueous electrolyte secondary batteries capable of providing higher energy density with increasing power consumption due to expansion in functionality of the mobile equipment.

Increased capacity of positive electrode materials is required to obtain nonaqueous electrolyte secondary batteries with high energy density; therefore, there have recently been more interest in layered compounds as the positive electrode materials. Positive electrode active materials such as $Li_2MnO_3$ and $Li_{1.2}Mn_{0.6}Ni_{0.2}O_2$ that is a solid solution of $Li_2MnO_3$ have been studied in order to obtain the positive electrode materials with increased capacity.

Meanwhile, it is known that a sodium transition metal oxide, which is a layered compound, is relatively easy to be synthesized, while many of lithium transition metal oxides, which are layered compounds, are difficult to be synthesized (see Patent Document 1, for example). Particularly, $Na_{0.7}CoO_2$ and $NaCo_{1/2}Mn_{1/2}O_2$ subjected to ion exchange of sodium for lithium can be utilized as the positive electrode active materials for lithium ion batteries.

Therefore, studies on a synthesis method of a sodium transition metal oxide and an ion exchange method, which is a chemical technique, have recently been active.

[Patent Document 1] JP 2002-220231 A

DISCLOSURE OF THE INVENTION

Problems to be Solved by the Invention

When the foregoing positive electrode active materials such as $Li_2MnO_3$ that can be increased in capacity are used for positive electrodes of the nonaqueous electrolyte secondary batteries, however, there remains such a problem that charge-discharge efficiency is initially low in the nonaqueous electrolyte secondary batteries.

An object of the present invention is to provide a nonaqueous electrolyte secondary battery capable of improving initial charge-discharge efficiency while maintaining high capacity and a method of manufacturing the same.

Means for Solving the Problems (1) According to an aspect of the present invention, a nonaqueous electrolyte secondary battery includes a positive electrode including a positive electrode active material, a negative electrode, and a nonaqueous electrolyte including lithium ions, wherein the positive electrode active material includes a first layered oxide whose initial charge-discharge efficiency when lithium metal is used for a counter electrode is less than 100%, and a second layered oxide that contains at least one of sodium and lithium, and whose initial charge-discharge efficiency when lithium metal is used for the counter electrode is 100% or more. Hereinafter, the initial charge-discharge efficiency of less than 100% and the initial charge-discharge efficiency of 100% or more are measured with lithium metal used for the counter electrode.

The first layered oxide whose initial charge-discharge efficiency is less than 100% has a large capacity density. When the first layered oxide is separately used as the positive electrode active material, however, part of lithium released in the nonaqueous electrolyte does not return to the positive electrode active material. Meanwhile, when the second layered oxide whose initial charge-discharge efficiency is 100% or more is separately used as the positive electrode active material, a significant amount of lithium is needed for the counter electrode (negative electrode).

In the nonaqueous electrolyte secondary battery, a mixed positive electrode active material formed by mixing the first layered oxide whose initial charge-discharge efficiency is less than 100% and the second layered oxide whose initial charge-discharge efficiency is 100% or more is used, so that lithium in the positive electrode active material can be effectively utilized. As a result, high capacity can be maintained and the initial charge-discharge efficiency can be improved.

In addition, a mixture ratio of the first layered oxide and the second layered oxide in such a mixed positive electrode active material is adjusted, so that the initial charge-discharge efficiency can be controlled to a desired value. Accordingly, various other materials with different reversibility (storage property and release property) of lithium ions other than a carbon material can be used as a negative electrode material.

Furthermore, mixture of the first layered oxide and the second layered oxide results in a lower average potential of the mixed positive electrode active material than an average potential of each of the first and second layered oxides before the mixture. This reduces a possibility of occurrence of oxidative decomposition reaction in the nonaqueous electrolyte.

(2) The first layered oxide may include $Li_{1+a}Mn_xCo_yNi_zO_2$, a is larger than 0 and smaller than 0.34, x, y and z are each not less than 0 and smaller than 1, and a+x+y+z is not less than 0.95 and not more than 1.05. In this case, the high capacity can be maintained and the initial charge-discharge efficiency can be further improved.

(3) The second layered oxide may include $Li_ANa_BMn_XCo_YN_ZO_2$, A is net less than 0 and not more than 0.22, B is not less than 0.6 and not more than 0.8, X, Y and Z are each not less than 0 and not more than 1, and X+Y+Z is not less than 0.95 and not more than 1.05. In this case, the initial charge-discharge efficiency can be further improved. Note that when a lithium ion battery is assembled using the positive electrode active material containing $Li_ANa_BMn_XCo_YN_ZO_2$, ion exchange of part of sodium in $Li_ANa_BMn_XCo_YN_ZO_2$ for lithium ions is performed, thus producing $Li_{A+\alpha}Na_{B-\alpha}Mn_XCo_YNi_ZO_2$. Here, $\alpha$ is larger than 0 and not more than B.

(4) The second layered oxide may include a sodium oxide having a P2 structure belonging to a space group $P6_3/mmc$. In this case, a crystal structure of the second layered oxide is stabilized, and charge-discharge can be well performed in the nonaqueous electrolyte secondary battery.

(5) The second layered oxide may include $Li_{A+\alpha}Na_{B-\alpha}Mn_XCo_YNi_ZO_2$ produced through ion exchange of part of sodium in $Li_ANa_BMn_XCo_YNi_ZO_2$ for lithium, and A is not less than 0 and not more than 0.22, B is not less than 0.6 and not more than 0.8, X, Y and Z are each not less than 0 and not more than 1, X+Y+Z is not less than 0.95 and not more than 1.05, and $\alpha$ is larger than 0 and not more than the B. In this case, the second layered oxide after the ion exchange was used, thereby improving a theoretical discharge capacity density per unit weight.

(6) $Li_{A+\alpha}Na_{B-\alpha}Mn_XCo_YNi_ZO_2$ may belong to a space group P6$_3$mc. In this case, charge-discharge performance can be stably maintained even at a high potential (5V (vs. Li/Li$^+$), for example).

(7) The second layered oxide may include at a ratio of less than 30 mol % $Li_{1+C}[Mn_DCo_{1-D}]_{1-C}O_2$ belonging to a space group C2/m or C2/c as a solid solution or a composite oxide, and C is not less than 0 and not more than ⅓, and D is larger than 0 and not more than 1. In this case, charge-discharge capacity can be further increased.

(8) The negative electrode may include at least one selected from a group composed of lithium metal, silicon, carbon, tin, germanium, aluminum, lead, indium, gallium, a lithium containing alloy, a carbon material in which lithium is previously stored, and a silicon material in which lithium is previously stored. The sufficient charge-discharge can be performed in the nonaqueous electrolyte secondary battery by using the negative electrode made of such a material.

(9) According to another aspect of the present invention, a method of manufacturing a nonaqueous electrolyte secondary battery includes the steps of fabricating a positive electrode including a positive electrode active material, fabricating a negative electrode, and forming a nonaqueous electrolyte including lithium ions, wherein the step of fabricating the positive electrode includes the steps of producing a first layered oxide whose initial charge-discharge efficiency when lithium metal is used for a counter electrode is less than 100%, producing a second layered oxide that contains at least one of sodium and lithium, and whose initial charge-discharge efficiency when lithium metal is used for the counter electrode is 100% or more, and forming the positive electrode active material by mixing the first layered oxide and the second layered oxide.

The first layered oxide whose initial charge-discharge efficiency is less than 100% has a large capacity density. When the first layered oxide is separately used as the positive electrode active material, however, part of lithium released in the nonaqueous electrolyte does not return to the positive electrode active material. Meanwhile, when the second layered oxide whose initial charge-discharge efficiency is 100% or more is separately used as the positive electrode active material, a significant amount of lithium is needed for the counter electrode (negative electrode).

In the method of manufacturing the nonaqueous electrolyte secondary battery, a mixed positive electrode active material formed by mixing the first layered oxide whose initial charge-discharge efficiency is less than 100% and the second layered oxide whose initial charge-discharge efficiency is 100% or more is used, so that lithium in the positive electrode active material can be effectively utilized. As a result, high capacity can be maintained and the initial charge-discharge efficiency can be improved.

In addition, a mixture ratio of the first layered oxide and the second layered oxide in such a mixed positive electrode active material is adjusted, so that the initial charge-discharge efficiency can be controlled to a desired value. Accordingly, various other materials with different reversibility (storage property and release property) of lithium ions other than a carbon material can be used as a negative electrode material.

Furthermore, mixture of the first layered oxide and the second layered oxide results in a lower average potential of the mixed positive electrode active material than an average potential of each of the first and second layered oxides before the mixture. This reduces a possibility of occurrence of oxidative decomposition reaction in the nonaqueous electrolyte.

(10) The step of producing the second layered oxide may include the step of producing the second layered oxide through ion replacement of part of sodium in a sodium oxide with lithium.

In this case, the second layered oxide after the ion exchange is used, thereby improving a theoretical discharge capacity density per unit weight.

Effects of the Invention

According to the present invention, high capacity can be maintained and initial charge-discharge efficiency can be improved.

BEST MODE FOR CARRYING OUT THE INVENTION

Description will be made of a nonaqueous electrolyte secondary battery according to one embodiment of the present invention. The nonaqueous electrolyte secondary battery according to the present embodiment is composed of a positive electrode, a negative electrode and a nonaqueous electrolyte.

(1) Positive Electrode (1-1) Example of Positive Electrode Active Material

The present embodiment employs a positive electrode active material, which is obtained by mixing a layered oxide with initial charge-discharge efficiency of less than 100% when lithium metal is used for a counter electrode (hereinafter referred to as a first layered oxide) and a layered oxide with initial charge-discharge efficiency of 100% or more when lithium metal is used for the counter electrode (hereinafter referred to as a second layered oxide). The foregoing positive electrode active material is hereinafter referred to as a mixed positive electrode active material. Here, the above-mentioned charge-discharge efficiency (%) is defined by a ratio of a discharge capacity density to a charge capacity density. The charge-discharge efficiency (%) is obtained on condition that measurement is performed with lithium used as the counter electrode.

A layered lithium-rich oxide (high lithium-containing layered oxide) can be used as the first layered oxide with the initial charge-discharge efficiency of less than 100%.

Examples of the first layered oxide include $Li_{1+a}Mn_xCo_yNi_zO_2$. In this layered oxide, $0<a<0.34$, $0\leq x<1$, $0\leq y<1$, $0\leq z<1$, $0.95\leq a+x+y z\leq 1.05$. Preferably, $0.15\leq a<0.34$, $0\leq x\leq 0.85$, $0\leq y\leq 0.85$, $0\leq z\leq 0.85$, $0.95\leq a+x+y+z\leq 1.05$ in the foregoing layered oxide.

A solid solution or a composite oxide of $Li_2MnO_3$ and $LiMO_2$, which belongs to a space group R3-m, can be used as the first layered oxide. For example, $xLi_2MnO_3+(1-x)LiMn_{1/3}Ni_{1/3}Co_{1/3}O_2$ ($0\leq x\leq 1$) corresponds to the foregoing solid solution or composite oxide, and when x is 0.6, the composition is $Li_{1.2}Mn_{0.54}Ni_{0.13}Co_{0.13}O_2$. Note that $Li_2MnO_3$ has a layered structure that belongs to a space group C2/c or C2/m. Although $Li_2MnO_3$ can be expressed by $LiMO_2$ as $Li(Li_{1/3}Mn_{2/3})O_2$, it is different from $LiMO_2$ belonging to the foregoing space group R3-m.

In addition, $LiMO_2$ belonging to the foregoing space group R3-m may be subjected to addition of, coating with or replacement with at least one of magnesium, zirconium, aluminum, molybdenum, and strontium at not more than 5% in order to improve various battery performance such as a cycle performance, a temperature performance and so on.

Moreover, sodium, manganese, cobalt, nickel, iron, copper, aluminum, titanium or the like may be used instead of the foregoing lithium as an element constituting the foregoing first layered oxide.

A sodium oxide, such as $Li_ANa_BMn_XCo_YNi_ZO_2$, other than a layered compound from which lithium is previously extracted by acid treatment or the like can be used as the second layered oxide with the initial charge-discharge efficiency of 100% or more in the present embodiment. In this sodium oxide, $0\leq A\leq 0.22$, $0.6\leq B\leq 0.8$, $0\leq X\leq 1$, $0\leq Y\leq 1$, $0\leq Z\leq 1$, $0.95\leq X+Y+Z\leq 1.05$.

The foregoing sodium oxide may have various crystal structures such as a P3 structure belonging to a space group R3m or a P2 structure belonging to a space group $P6_3$/mmc. In particular, the sodium oxide having the P2 structure belonging to the space group $P6_3$/mmc is preferably used as the second layered oxide.

While lithium is not necessarily contained in the foregoing sodium oxide, the discharge capacity density is increased with increasing the amount of lithium in a range of $0\leq A\leq 0.22$. When this sodium oxide is measured by an XRD (X-Ray Diffractometer), a peak (a peak when a diffraction angle $2\theta$ is in a range from 18.5° to 19.5°) that is considered to be derived from the crystal structure of $Li_2MnO_3$ (the space group C2/c or C2/m) appears. When the foregoing A excesses 0.22, the discharge capacity density decreases.

Note that when a sodium oxide not containing lithium is used in the nonaqueous electrolyte secondary battery as the second layered oxide, part of sodium in the sodium oxide is replaced with lithium ions in the electrolyte through ion exchange.

Here, the foregoing $Li_ANa_BMn_XCo_YNi_ZO_2$ can be directly used as the foregoing second layered oxide, or a layered oxide resulting from replacement (ion exchange) of sodium in the foregoing $Li_ANa_BMn_XCo_YNi_ZO_2$ with lithium can be used as the second layered oxide. The theoretical discharge capacity density per unit weight can be improved through ion exchange of sodium in $Li_ANa_BMn_XCo_YNi_ZO_2$ for lithium.

In this case, the layered oxide after the ion exchange is expressed by $Li_{A+\alpha}Na_{B-\alpha}Mn_XCo_YNi_ZO_2$. In the foregoing layered oxide after the ion exchange, $0\leq A\leq 0.22$, $0.6\leq B\leq 0.8$, $0<\alpha\leq b$, $0\leq X\leq 1$, $0\leq Y\leq 1$, $0\leq Z\leq 1$, $0.95\leq X+Y+Z\leq 1.05$.

While the foregoing layered oxide whose crystal structure is the P2 structure belonging to the space group $P6_3$/mmc is subjected to structural change after the ion exchange, the crystal structure of $Li_{A+\alpha}Na_{B-\alpha}Mn_XCo_YNi_ZO_2$ directly formed using lithium without performing the ion exchange is definitely different from a space group R-3m.

The layered oxide after the ion exchange preferably belongs to a space group $P6_3$mc, P3m1 or P-6m2.

The layered oxide after the ion exchange may contain $Li_2MnO_3$ belonging to the space group C2/c or C2/m similarly to the sodium oxide before the ion exchange. Since the amount of $Li_2MnO_3$ does not experimentally excess the amount of prepared lithium, the content of $Li_2MnO_3$ is less than 30 mol % in each of the layered oxide before the ion exchange and the layered oxide after the ion exchange. Note that the content of $Li_2MnO_3$ is preferably less than 20 mol %, and more preferably less than 10 mol %. $Li_2MnO_3$ is one example of $Li_{1+C}[Mn_DCo_{1-D}]_{1-C}O_2$, wherein C is 1/3 and D is 1.

(1-2) Methods of Forming Each Positive Electrode Active Material and Mixed Positive Electrode Active Material and Method of Fabricating Positive Electrode Next, description is made of methods of forming the first layered oxide having the initial charge-discharge efficiency of less than 100%, the second layered oxide having the initial charge-discharge efficiency of 100% or more and the mixed positive electrode active material.

First, the method of forming the first layered oxide having the initial charge-discharge efficiency of less than 100% is described below.

Lithium (Li), manganese (Mn) and cobalt (Co) are mixed using lithium hydroxide and manganese-cobalt hydroxide that is formed by coprecipitation process such that a ratio of the numbers of moles thereof expressed in this order is Li:Mn:Co=1.17:0.33:0.5, for example.

The resulting mixture is fired for 20 hours in an air at 900° C., for example. In this manner, the first layered oxide having the initial charge-discharge efficiency of less than 100% can be obtained.

Next, the method of forming the second layered oxide having the initial charge-discharge efficiency of 100% or more is described below.

First, sodium acetate, lithium carbonate, manganese oxide (III) and cobalt oxide (II III) as starting materials are prepared, and sodium (Na), cobalt (Co), and manganese (Mn) are mixed such that a ratio of the numbers of moles thereof expressed in this order is Na:Co:Mn=0.7:0.5:0.5, for example.

Then, powder resulting from the mixture is molded into pellets. The pellets are subjected to preliminary firing for 10 hours in an air at 700° C., and subsequently to main firing for 20 hours in an air at 800° C., for example. The foregoing material after the main firing is then washed with water. In this manner, the sodium oxide having the P2 structure as the second layered oxide can be obtained. Moreover, a sodium oxide to which lithium is added (a lithium-added sodium oxide) as the second layered oxide can be obtained in the same manner. The lithium-added sodium oxide has a peak (a peak when the diffraction angle $2\theta$ is in the range from 18.5° to 19.5°) that is considered to be derived from the crystal structure of $Li_2MnO_3$ in XRD spectrum.

Note that the second layered oxide with the initial charge-discharge efficiency of 100% or more can be also obtained by performing the ion exchange to the foregoing sodium oxide or lithium-added sodium oxide as follows.

The foregoing sodium oxide or lithium-added sodium oxide is added to a mixture obtained by mixing lithium nitrate and lithium chloride at a weight ratio of 88:11, for example, such that a weight ratio of the mixture and the oxide is 10:3. A material after the addition is left for 10 hours under temperature environment of 300° C., for example, thus carrying out the ion exchange. Such ion exchange allows a sodium oxide containing lithium with the initial charge-discharge efficiency of 100% or more to be obtained as the second layered oxide.

Then, the method of forming the mixed positive electrode active material is described as follows.

The first layered oxide with the initial charge-discharge efficiency of less than 100% and the second layered oxide with the initial charge-discharge efficiency of 100% or more that are formed in the above-described manner are mixed at a weight ratio of 35:65, for example. In this manner, the mixed positive electrode active material can be obtained. While the mixture may be performed by hand using an agate mortar or the like, the mixture is preferably performed using a grinder or the like for at least 20 minutes, for example. Accordingly, the mixture with a sufficiently good degree can be achieved.

Next, the method of fabricating the positive electrode is described as follows.

For example, 80% by weight of the mixed positive electrode active material, 10% by weight of acetylene black as conductive agent and 10% by weight of polyvinylidene fluoride as a binder are mixed, so that a positive electrode material is obtained.

The positive electrode material is mixed into an N-methyl-2-pyrrolidone solution of, for example, 10% by weight to the positive electrode material, thus producing slurry as a positive electrode mixture.

Next, the produced slurry is applied on an aluminum foil as a positive electrode collector by a doctor blade method, and subsequently dried in a vacuum at 110° C., for example, thereby forming a positive electrode active material layer.

Then, a positive electrode tab is arranged on a region of the aluminum foil where the positive electrode active material is not formed, so that the positive electrode is completed.

Note that at least one selected from polytetrafluoroethylene, polyvinylidene fluoride, polyethylene oxide, polyvinyl acetate, polymethacrylate, polyacrylate, polyacrylonitrile, polyvinyl alcohol, styrene-butadiene rubber, carboxymethylcellulose or the like can be used as the binder that is added during fabrication of the positive electrode.

A large amount of the added binder leads a small ratio of the positive electrode active material contained in the positive electrode, so that high energy density is not obtained. Accordingly, the amount of the added binder is set to within a range of 0 to 30% by weight of the entire positive electrode, preferably within a range of 0 to 20% by weight, and more preferably within a range of 0 to 10% by weight.

Moreover, the conductive agent is preferably added during the fabrication of the positive electrode in order to obtain better charge-discharge performance as described above.

Any materials with conductivity may be used as the conductive agent. Particularly, at least one of oxide, carbide, nitride, a carbon material, boride, and silicide that have high conductivity can be preferably used.

Examples of the oxide with high conductivity include tin oxide, indium oxide and the like. Examples of the carbide with high conductivity include titanium carbide (TiC), tantalum carbide (TaC), niobium carbide (NbC), tungsten carbide (WC), and the like.

Examples of the nitride with high conductivity include titanium nitride (TiN), tantalum nitride (TaN), niobium nitride (NbN), tungsten nitride (WN) and the like. Examples of the carbon material with high conductivity include Ketjen black, acetylene black, graphite and the like.

Examples of boride with high conductivity include $TiB_2$, $ZrB_2$, $HfB_2$, $VB_2$, $NbB_2$, $TaB_2$, $CrB$, $CrB_2$, $Mo_2B$, $MoB$, $Mo_2B_5$, $WB$, $W_2B_5$, $LaB_6$, and the like.

Examples of silicide with high conductivity include $TiSi_2$, $ZrSi_2$, $NbSi_2$, $TaSi_2$, $CrSi_2$, $Mo_5Si_3$, $MoSi_2$, and the like.

A small amount of the added conductive agent makes it difficult to sufficiently improve the conductivity in the positive electrode. Meanwhile, a large amount of the added conductive agent leads a small ratio of the positive electrode active material contained in the positive electrode, so that high energy density is not obtained. Accordingly, the amount of the added conductive agent is set to within a range of 0 to 30% by weight of the entire positive electrode, preferably within a range of 0 to 20% by weight, and more preferably within a range of 0 to 10% by weight.

(2) Negative Electrode

One or plurality of materials selected from a group composed of lithium metal, silicon, carbon, tin, germanium, aluminum, lead, indium, gallium, a lithium-containing alloy, a carbon material in which lithium is previously stored and a silicon material in which lithium is previously stored can be used as a negative electrode material capable of storing and releasing lithium ions.

Especially in terms of the cost, the carbon material is preferably used as the negative electrode material. Specific examples of the carbon material include natural graphite, artificial graphite, mesophase pitch-based carbon fiber (MCF), mesocarbon microbead (MCMB), coke, hard carbon, fullerene, carbon nanotube and the like.

(3) Nonaqueous Electrolyte

A nonaqueous electrolyte produced by dissolving an electrolyte salt in a nonaqueous solvent can be used.

Examples of the nonaqueous solvent may include cyclic carbonate, chain carbonate, esters, cyclic ethers, chain ethers, nitriles, amides, and a combination thereof, which are typically used as the nonaqueous solvent for a battery.

Examples of the cyclic carbonate may include ethylene carbonate, propylene carbonate, butylene carbonate, and any of the above having its hydrogen group partly or entirely fluorinated such as trifluoropropylene carbonate and fluoroethylene carbonate.

Examples of the chain carbonate may include dimethyl carbonate, ethyl methyl carbonate, diethyl carbonate, methyl propyl carbonate, ethyl propyl carbonate, methyl isopropyl carbonate, and any of the above having its hydrogen group partly or entirely fluorinated.

Examples of the esters may include methyl acetate, ethyl acetate, propyl acetate, methyl propionate, ethyl propionate, and γ-butyrolactone. Examples of the cyclic ethers may include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ether.

Examples of the chain ethers may include 1,2-dimethoxyethane, diethyl ether, dipropyl ether, diisopropyl ether, dibutyl ether, dihexyl ether, ethyl vinyl ether, butyl vinyl ether, methylphenyl ether, ethylphenyl ether, butylphenyl ether, pentylphenyl ether, methoxytoluene, benzylethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Examples of the nitriles may include acetonitrile, and examples of the amides may include dimethylformamide.

An example of the electrolyte salt is selected from a group composed of lithium phosphate hexafluoride ($LiPF_6$), lithium borate tetrafluoride ($LiBF_4$), $LiCF_3SO_3$, $LiC_4F_9SO_3$, $LiN(CF_3SO_2)_2$, $LiN(C_2F_5SO_2)_2$, $LiAsF_6$ and difluoro(oxalato) lithium borate that are soluble in a non-aqueous solvent, not peroxide, and have high safety. One or combinations of not less than two of the above-mentioned electrolyte salts may be used.

In this embodiment, for example, a non-aqueous solvent obtained by mixing ethylene carbonate and diethyl carbonate at a volume ratio of 30:70 to which lithium phosphate hexafluoride as an electrolyte salt is added at a concentration of 1 mol/l) can be used as a non-aqueous electrolyte.

(4) Fabrication of Nonaqueous Electrolyte Secondary Battery (Test Cell)

A test cell of the nonaqueous electrolyte secondary battery is fabricated as follows using the foregoing positive electrode, negative electrode and nonaqueous electrolyte.

Figure 1:
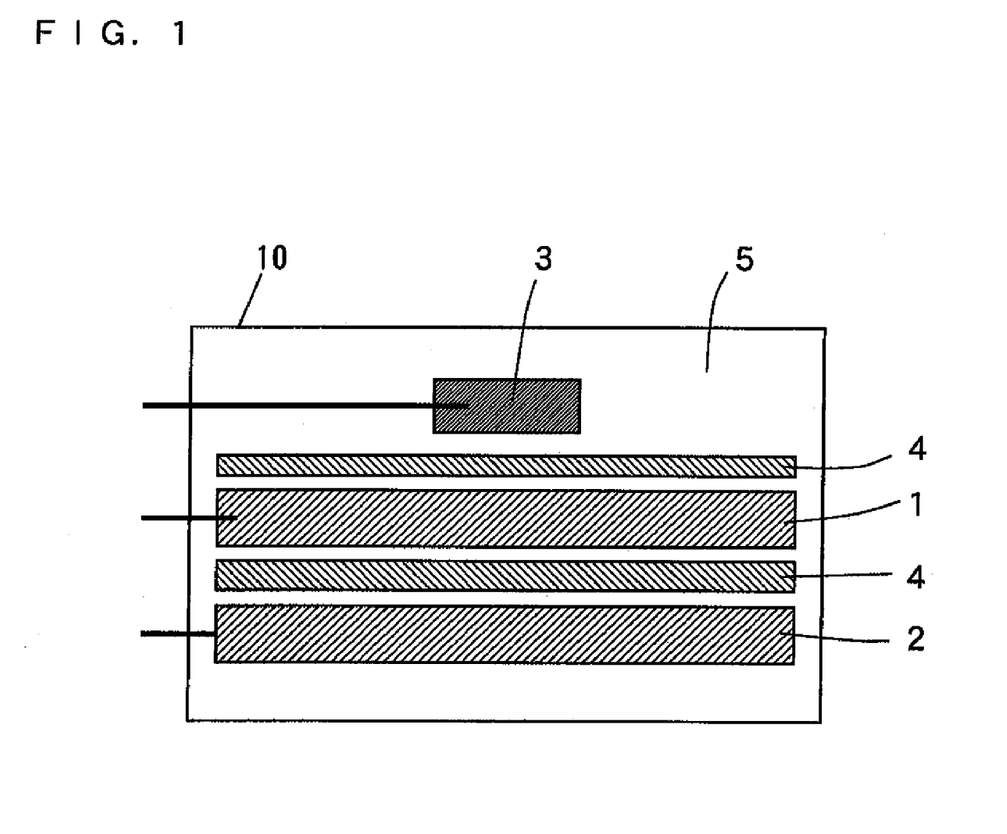
FIG. 1 is a schematic explanatory view of a test cell of a nonaqueous electrolyte secondary battery according to the present embodiment.

FIG. 1 is a schematic explanatory view of the test cell of the nonaqueous electrolyte secondary battery according to the present embodiment.

As shown in FIG. 1, under an inert atmosphere, a lead is attached to the foregoing positive electrode to form a working electrode 1, and a lead is attached to the foregoing negative electrode that is made of a lithium metal to form a counter electrode 2.

Next, a separator 4 is inserted between the working electrode 1 and the counter electrode 2, and then the working electrode 1, the counter electrode 2, and a reference electrode 3 that is made of, for example, a lithium metal are arranged in a laminate vessel 10. The above-described non-aqueous electrolyte 5 is injected into the laminate vessel 10 to fabricate the nonaqueous electrolyte secondary battery as the test cell. Note that a separator 4 is also inserted between the working electrode 2 and the reference electrode 3.

(5) Effects of the Present Embodiment

The first layered oxide with the initial charge-discharge efficiency of less than 100% has a large capacity density. When the first layered oxide is separately used as the positive electrode active material, however, part of lithium released in the nonaqueous electrolyte 5 does not return to the positive electrode active material. Meanwhile, when the second layered oxide with the initial charge-discharge efficiency of 100% or more is separately used as the positive electrode active material, the counter electrode needs a significant amount of lithium. In the present embodiment, the mixed positive electrode active material formed by mixture of the first layered oxide with the initial charge-discharge efficiency of less than 100% and the second layered oxide with the initial charge-discharge efficiency of 100% or more is used, so that lithium in the positive electrode material can be effectively utilized. As a result, high capacity can be maintained and the initial charge-discharge efficiency can be improved.

In addition, a mixture ratio of the first layered oxide and the second layered oxide in such a mixed positive electrode active material is adjusted, so that the initial charge-discharge efficiency can be controlled to a desired value. Accordingly, various other materials with different reversibility (storage property and release property) of lithium ions other than the carbon material can be used as the negative electrode material.

The first layered oxide and the second layered oxide are mixed, so that an average potential (V) of the mixed positive electrode active material is smaller than an average potential of each of the first and second layered oxides before the mixture. This reduces possibility of occurrence of oxidative decomposition reaction in the nonaqueous electrolyte.

INVENTIVE EXAMPLE (a) Inventive Example 1

(a-1) Charge-Discharge Test

The test cell of the nonaqueous electrolyte secondary battery was fabricated based on the foregoing embodiment, and the charge-discharge test was performed using the fabricated test cell. A current density as used herein was 0.125 mA/cm$^2$, which corresponds to about 1/8 It. Note that a current value at which a rated capacity is completely discharged in an hour is referred to as a rated current, and expressed as 1.0 C. This is expressed as 1.0 It by SI (System International) units.

Examples of the first layered oxide with the initial charge-discharge efficiency of less than 100% used in the charge-discharge test, and initial discharge capacity densities, initial charge-discharge efficiencies and average potentials thereof are shown in Table 1.

TABLE 1

| No. | COMPOSITION FORMULA | INITIAL DISCHARGE CAPACITY DENSITY [mAh/g] | INITIAL CHARGE-DISCHARGE EFFICIENCY [%] | AVERAGE POTENTIAL [V] |
|---|---|---|---|---|
| (1) | $Li[Li_{0.2}Mn_{0.54}Ni_{0.13}Co_{0.13}]O_2$ | 252 | 79 | 3.64 |
| (2) | $Li[Li_{0.17}Mn_{0.33}Co_{0.50}]O_2$ | 223 | 71 | 3.68 |
| (3) | $Li_{1.2}Mn_{0.53}Ni_{0.27}O_2$ | 221 | 74 | 3.66 |
| (4) | $Li_2MnO_3$ | 186 | 52 | 3.41 |
| (5) | $0.3Li_2MnO_3 \cdot 0.7LiMn_{0.5}Ni_{0.5}O_2$ | 219 | 78 | 3.60 |
| (6) | $Li[Li_{0.2}Mn_{0.6}Ni_{0.2}]O_2$ | 288 | 90 | 3.60 |

In Table 1, a discharge cutoff potential and a charge cutoff potential were set to 2.0-4.8 V (vs. Li/Li$^+$) in the nonaqueous electrolyte secondary batteries using the first layered oxides (1) and (2), respectively, as the positive electrode active material, and the discharge cutoff potential and the charge cutoff potential were set to 2.0-5.0 V (vs. Li/Li$^+$) in the nonaqueous electrolyte secondary batteries using the first layered oxides (3) to (6), respectively, as the positive electrode active material.

Charge was performed until the potential (charge cutoff potential) attains 4.8 V or more, so that the large initial discharge capacity density was obtained as shown in Table 1.

Next, examples of the second layered oxide with the initial charge-discharge efficiency of 100% or more used in the charge-discharge test, and the initial discharge capacity densities, the initial charge-discharge efficiencies and the average potentials thereof are described.

TABLE 2

| No. | COMPOSITION FORMULA | INITIAL DISCHARGE CAPACITY DENSITY [mAh/g] | INITIAL CHARGE-DISCHARGE EFFICIENCY [%] | AVERAGE POTENTIAL [V] |
|---|---|---|---|---|
| [1] | $Na_{0.6}Mn_{0.5}Co_{0.5}O_2$ | 140 | 233 | 3.39 |
| [2] | $Na_{0.7}Mn_{0.5}Co_{0.5}O_2$ | 136 | 227 | 3.35 |
| [3] | $Na_{0.8}Mn_{0.5}Co_{0.5}O_2$ | 140 | 250 | 3.31 |
| [4] | $Na_{0.7}Co_{0.67}Ni_{0.33}O_2$ | 98 | 172 | 3.63 |
| [5] | $Na_{0.7}Mn_{0.67}Ni_{0.33}O_2$ | 189 | 160 | 3.58 |
| [6] | $Na_{0.7}Mn_{0.3}Co_{0.4}Ni_{0.3}O_2$ | 141 | 174 | 3.61 |
| [7] | $Na_{0.7}Li_{0.16}Mn_{0.5}Co_{0.5}O_2$ | 140 | 167 | 3.52 |
| [8] | $Na_{0.7}Li_{0.22}Mn_{0.5}Co_{0.5}O_2$ | 117 | 138 | 3.58 |

In Table 2, the discharge cutoff potential and the charge cutoff potential were set to 2.0-4.5 V (vs. Li/Li$^+$) in the nonaqueous electrolyte secondary batteries using the second layered oxides, respectively. The second layered oxide [5] in Table 2 has the P3 structure belonging to the space group R3m, and the second layered oxides excluding the second layered oxide [5] in Table 2 have the P2 structure belonging to the space group P6$_3$/mmc.

In this example, sodium in each of the second layered oxides of Table 2 was replaced (ion exchange) with lithium based on the foregoing embodiment, so that the second layered oxides with the initial charge-discharge efficiency of 100% or more were formed.

A material resulting from the ion exchange of the second layered oxide [2] of Table 2 (the second layered oxide <I>) is expressed as $Na_{0.7-\alpha}Li_{\alpha}Mn_{0.5}Co_{0.5}O_2$, and a material resulting from the ion exchange of the second layered oxide [7] of Table 2 (the second layered oxide <II>) is expressed as $Na_{0.7-\alpha}Li_{0.16+\alpha}Mn_{0.5}Co_{0.5}O_2$.

The initial discharge capacity densities, initial charge-discharge efficiencies and average potentials in the charge-discharge test (three patterns of the discharge cutoff potential and the charge cutoff potential) using the foregoing second layered oxide <I> and the second layered oxide <II> are shown in Table 3.

by about 0.1 V than the average potential of each of the foregoing first layered oxides and second layered oxides before the mixture. Accordingly, it is considered that the possibility of occurrence of the oxidative decomposition reaction in the nonaqueous electrolyte was reduced, and a level of safety was improved.

(b) Inventive Example 2

(b-1) Test sample A (first layered oxide)
Coprecipitate of manganese, nickel and cobalt in a 54:13:13 (Mn:Ni:Co) ratio and lithium hydroxide was fired for 20 hours at 900° C., so that $Li_{1.2}Mn_{0.54}Co_{0.13}Ni_{0.13}O_2$ was obtained as the test sample A. The test sample A corresponds to the first layered oxide.

(b-2) Test sample B (Second layered oxide)
$Na_{0.7}Li_{0.1}Mn_{0.5}Co_{0.5}O_2$ (a mixture of 88% lithium nitrate and 11% lithium chloride) was put in a molten salt bed, and held for 10 hours at 300° C., so that $Li_{0.81}Mn_{0.5}Co_{0.5}O_2$ was obtained as the test sample B. The test sample B corresponds to the second layered oxide.

As a result of an elemental analysis of the obtained test sample B, it is estimated that the ratio of lithium, manganese

TABLE 3

| No. | TEST SAMPLE | INITIAL DISCHARGE CAPACITY DENSITY [mAh/g] | INITIAL CHARGE-DISCHARGE EFFICIENCY [%] | AVERAGE POTENTIAL [V] |
| --- | --- | --- | --- | --- |
| <I> | 2.5-4.5 V(vs.Li/Li$^+$)RANGE | 123 | 202 | 3.37 |
|  | 2.5-4.8 V(vs.Li/Li$^+$)RANGE | 164 | 140 | 3.64 |
|  | 2.5-5.0 V(vs.Li/Li$^+$)RANGE | 176 | 134 | 3.70 |
| <II> | 2.5-4.5 V(vs.Li/Li$^+$)RANGE | 152 | 162 | 3.50 |
|  | 2.5-4.8 V(vs.Li/Li$^+$)RANGE | 217 | 125 | 3.65 |
|  | 2.5-5.0 V(vs.Li/Li$^+$)RANGE | 223 | 119 | 3.66 |

The first layered oxide (2) of Table 1 and the second layered oxide <I> of Table 3 were mixed, thereby forming the mixed positive electrode active material.

Mixture ratios (three patterns:weight ratios), the initial charge-discharge efficiencies, the initial charge capacity densities, the initial discharge capacity densities, and the average potentials are shown in Table 4.

and cobalt is 0.81:0.5:0.5 (Li:Mn:Co), and oxygen is $O_2$. Regarding oxygen, it is considered that some oxygen deficiency may exist.

Figure 2:
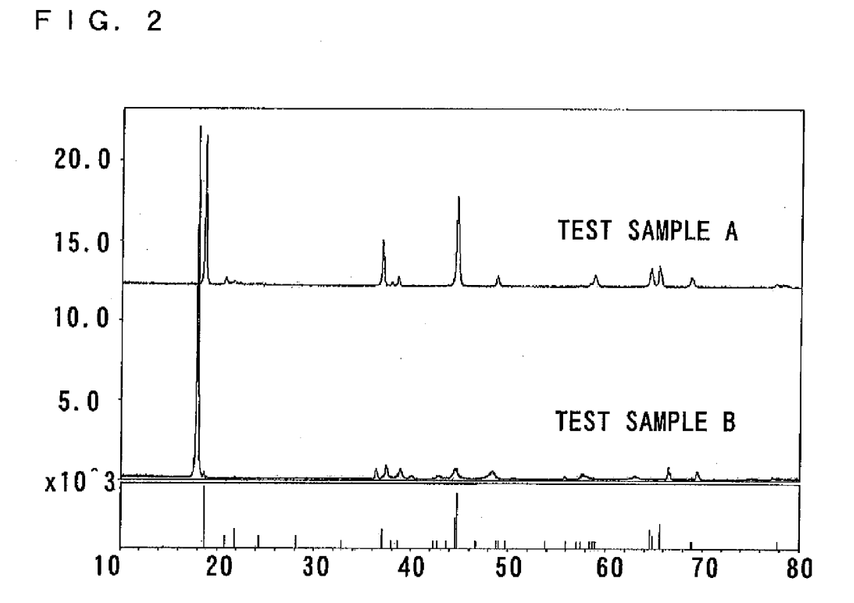
FIG. 2 is a diagram showing XRD profiling of a test sample A and a test sample B.
Figure 3:
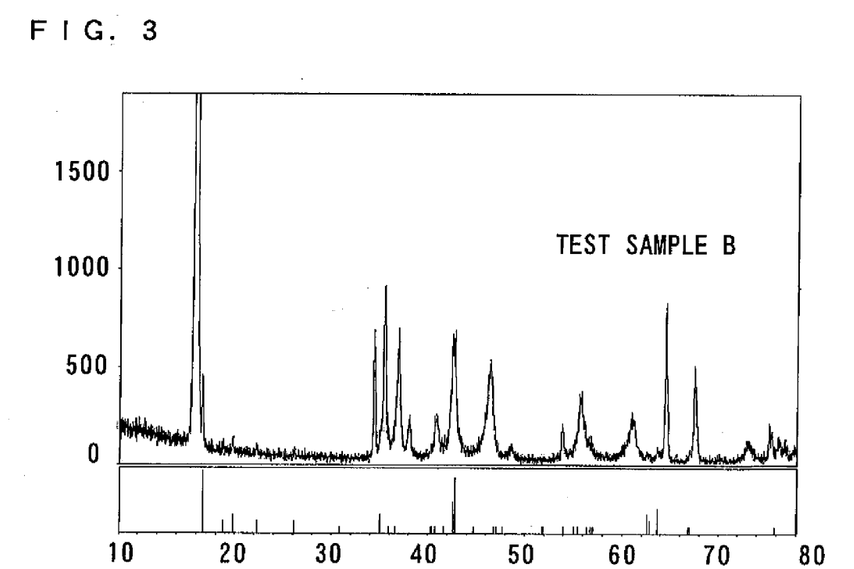
FIG. 3 is an enlarged view of the XRD profiling of the test sample B.

(b-3) XRD Measurement and Charge-discharge Test of the Test Sample A and Test Sample B
XRD measurement of the obtained test sample A and test sample B was performed. The results are shown in FIGS. 2

TABLE 4

| No. | TEST SAMPLE | INITIAL CHARGE-DISCHARGE EFFICIENCY [%] | INITIAL CHARGE CAPACITY DENSITY [mAh/g] | INITIAL DISCHARGE CAPACITY DENSITY [%] | AVERAGE POTENTIAL [V] |
| --- | --- | --- | --- | --- | --- |
| A1 | (2):<I> = 50:50 | 78 | 224 | 175 | 3.56 |
| A2 | (2):<I> = 35:65 | 95 | 182 | 173 | 3.52 |
| A3 | (2):<I> = 20:80 | 105 | 158 | 166 | 3.51 |

Note that in Table 4, the discharge cutoff potential and the charge cutoff potential were set to 2.5-4.8 V (vs. Li/Li$^+$) in the nonaqueous electrolyte secondary batteries using the mixed positive electrode active materials, respectively. The average potentials of the first layered oxide (2) and the second layered oxide <I> in the range of 2.5-4.8 V were 3.68 V and 3.64 V, respectively.

a-2) Evaluation
It can be seen from Table 4 that when the initial charge-discharge efficiency and the initial discharge capacity density are especially focused on, the first layered oxide (2) having the initial charge-discharge efficiency of less than 100% and the second layered oxide <I> having the initial charge-discharge efficiency of 100 or more are preferably mixed in a 35:65 ratio to achieve balance between the initial charge-discharge efficiency and the initial discharge capacity density.

In addition, Table 4 shows that the average potential of each of the mixed positive electrode active materials was smaller and 3. FIG. 2 shows XRD profiling of the test sample A and test sample B, and FIG. 3 shows an enlarged view of the XRD profiling of the test sample B. Note that X-ray diffraction data of $Li_2MnO_3$ (PDF#27-1252) belonging to the space group C2/c or C2/m is shown using Powder Diffraction File (PDF) of a powder X-ray database (International Center for Diffraction Data (ICDD)) in lower stages of FIGS. 2 and 3.

As shown in FIGS. 2 and 3, existence of peaks arising from $Li_2MnO_3$ belonging to the space group C2/c or C2/m in the test sample A and test sample B was confirmed. According to the XRD measurement, it was presumed that the test sample B belonged to the space group P6$_3$mc.

Figure 4:
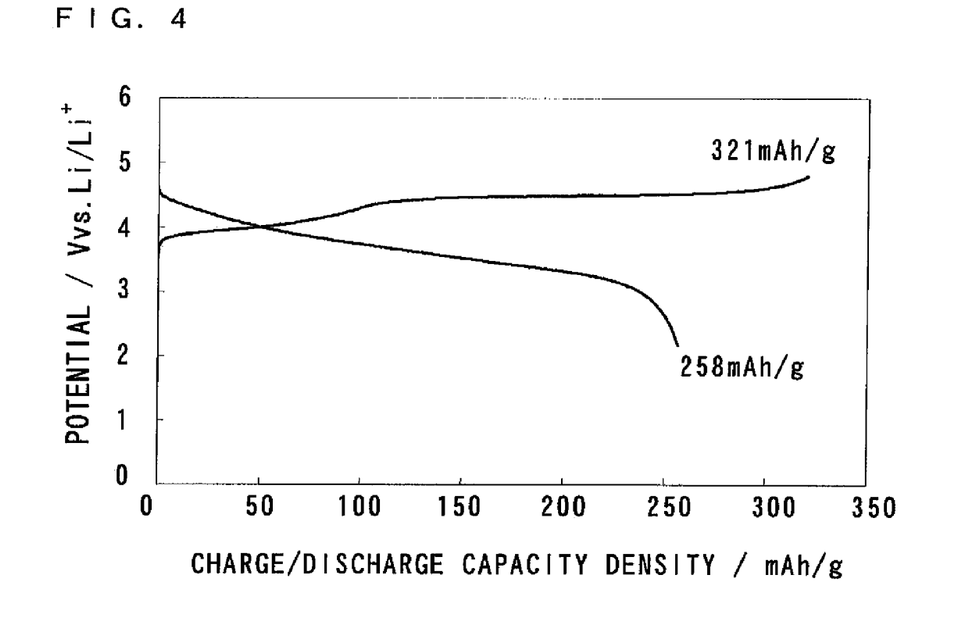
FIG. 4 is a diagram showing a result of a charge-discharge test of a test cell using the test sample A.

The charge-discharge test was performed in the test cell with the positive electrode containing the test sample A as the positive electrode active material. Note that the current density was 20 lt, and the charge-discharge range was 2.0 V-4.8 V (vs. Li/Li$^+$). The result is shown in FIG. 4. As shown in FIG.

4, the charge-discharge test resulted in the initial discharge capacity density of 258 mAh/g, the initial charge-discharge efficiency of 80%, and the average potential of 3.61 V (vs. Li/Li$^+$).

Figure 5:
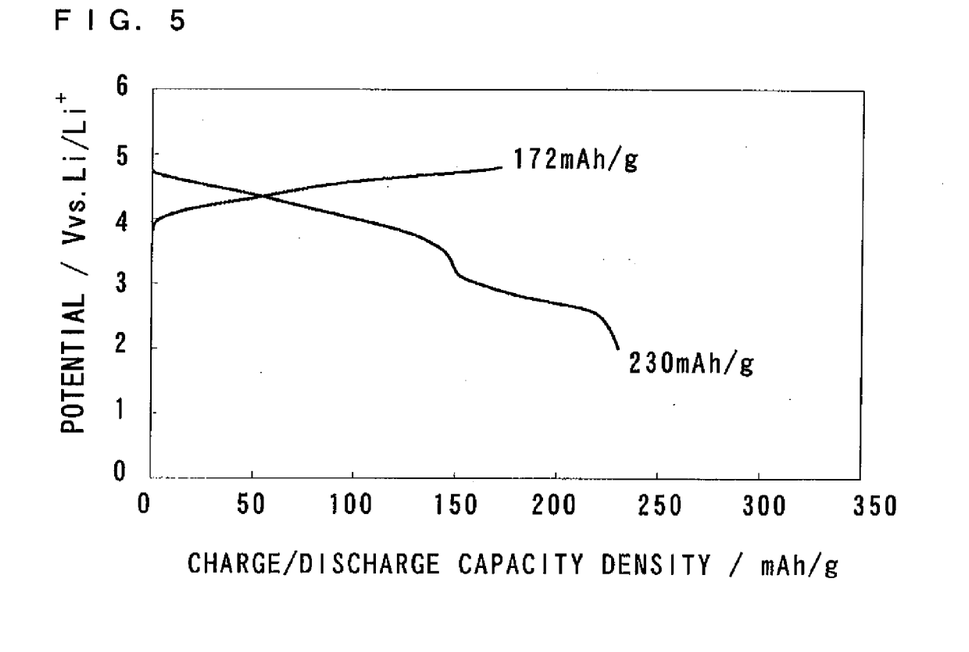
FIG. 5 is a diagram showing a result of the charge-discharge test of a test cell using the test sample B.

The charge-discharge test was performed in the test cell with the positive electrode containing the test sample B as the positive electrode active material. Note that the current density was 20 lt, and the charge-discharge range was 2.0 V-4.8 V (vs. Li/Li$^+$). The result is shown in FIG. 5. As shown in FIG. 5, the charge-discharge test resulted in the initial discharge capacity density of 230 mAh/g, the initial charge-discharge efficiency of 133%, and the average potential of 3.66 V (vs. Li/Li$^+$).

(b-4) Mixed Positive Electrode Active Material

Two types of the mixed positive electrode active materials were formed by mixing the foregoing test sample A and test sample B at 60:40 (weight %) and 50:50 (weight %). Respective test cells were formed using these mixed positive electrode active materials, and the charge-discharge test was performed. Note that the current density was 20 lt, and the charge-discharge range was 2.0 V-4.8 V (vs. Li/Li$^+$).

Figure 6:
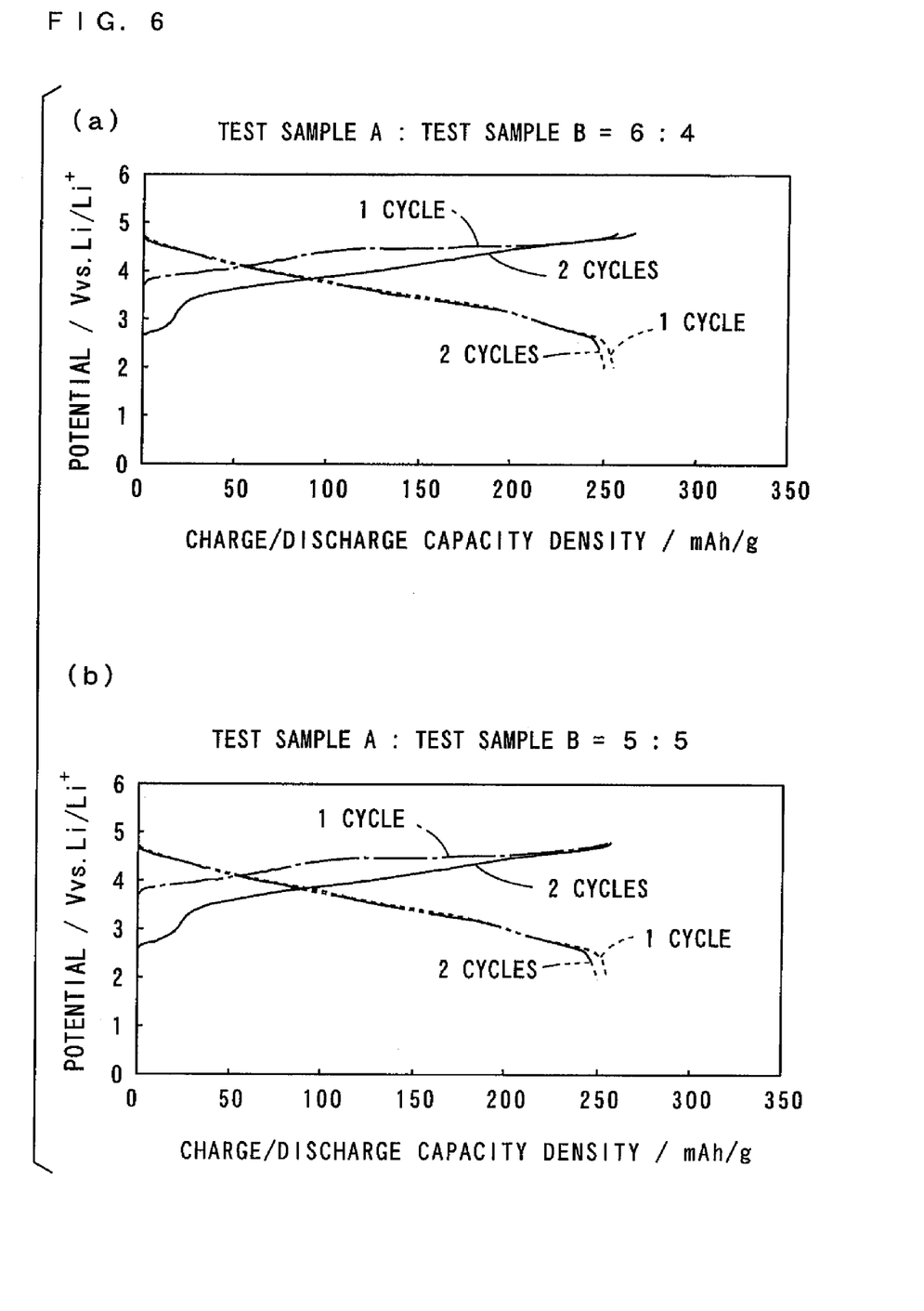
FIG. 6 is a diagram showing results of the charge-discharge test of test cells using mixed positive electrode active materials formed by mixing the test sample A and the test sample B.

FIG. 6 (a) shows the result of using the mixed positive electrode active material in which the test sample A and the test sample B were mixed at 60:40 (weight %), and FIG. 6 (b) shows the result of using the mixed positive electrode active material in which the test sample A and the test sample B were mixed at 50:50 (weight %).

As shown in FIG. 6 (a), when the mixed positive electrode active material in which the test sample A and the test sample B were mixed at 60:40 (weight %) was used, the initial discharge capacity density was 255 mAh/g, the average discharge potential was 3.59 V (vs. Li/Li$^+$), and the initial charge-discharge efficiency was 96%. As shown in FIG. 6 (b), when the mixed positive electrode active material in which the test sample A and the test sample B were mixed at 50:50 (weight %) was used, the initial discharge capacity density was 255 mAh/g, the average discharge potential was 3.58 V (vs. Li/Li$^+$), and the initial charge-discharge efficiency was 100%.

As described above, $Li_{1.2}Mn_{0.54}Co_{0.13}Ni_{0.13}O_2$ was used as the first layered oxide of the mixed positive electrode active material, and $Li_{0.81}Mn_{0.5}Co_{0.5}O_2$ was used as the second layered oxide, so that high capacity was maintained and the initial charge-discharge efficiency was improved.

(c) Inventive Example 3

(c-1) Fabrication of the Positive Electrode

The mixed positive electrode active material in which the test sample A and the test sample B of the inventive example 2 were mixed at 50:50 (weight %), carbon as the conductive agent, and an N-methyl-2-pyrrolidone solution with polyvinylidene-fluoride as the binder dissolved therein were adjusted such that the weight ratio of the mixed positive electrode active material, the conductive agent and the binder was 90:5:5 to be kneaded, so that the positive electrode slurry was prepared. The prepared positive electrode slurry was applied on an aluminum foil as the collector to be dried, so that a positive plate was obtained. Then, the obtained positive plate was cut in a long-sized shape of 750×55 mm$^2$, thus obtaining the positive electrode.

(c-2) Fabrication of the Negative Electrode

Graphite as a negative electrode active material, styrene-butadiene rubber as the binder, and an aqueous solution in which carboxy-methyl-cellulose as a thickener was dissolved were adjusted such that a weight ratio of the negative electrode active material, the binder and the thickener was 98:1:1 to be kneaded, so that negative electrode slurry was prepared. The prepared negative electrode slurry was applied on a copper foil as the collector to be dried, thus obtaining a negative plate. Note that an amount of application of the negative electrode slurry was adjusted such that a negative electrode/positive electrode initial charge capacity ratio was 1.1. Then, the obtained negative plate was cut in a long-sized shape of 785×58 mm$^2$, thus obtaining the negative electrode.

(c-3) Fabrication of Wind Test Cell

Figure 7:
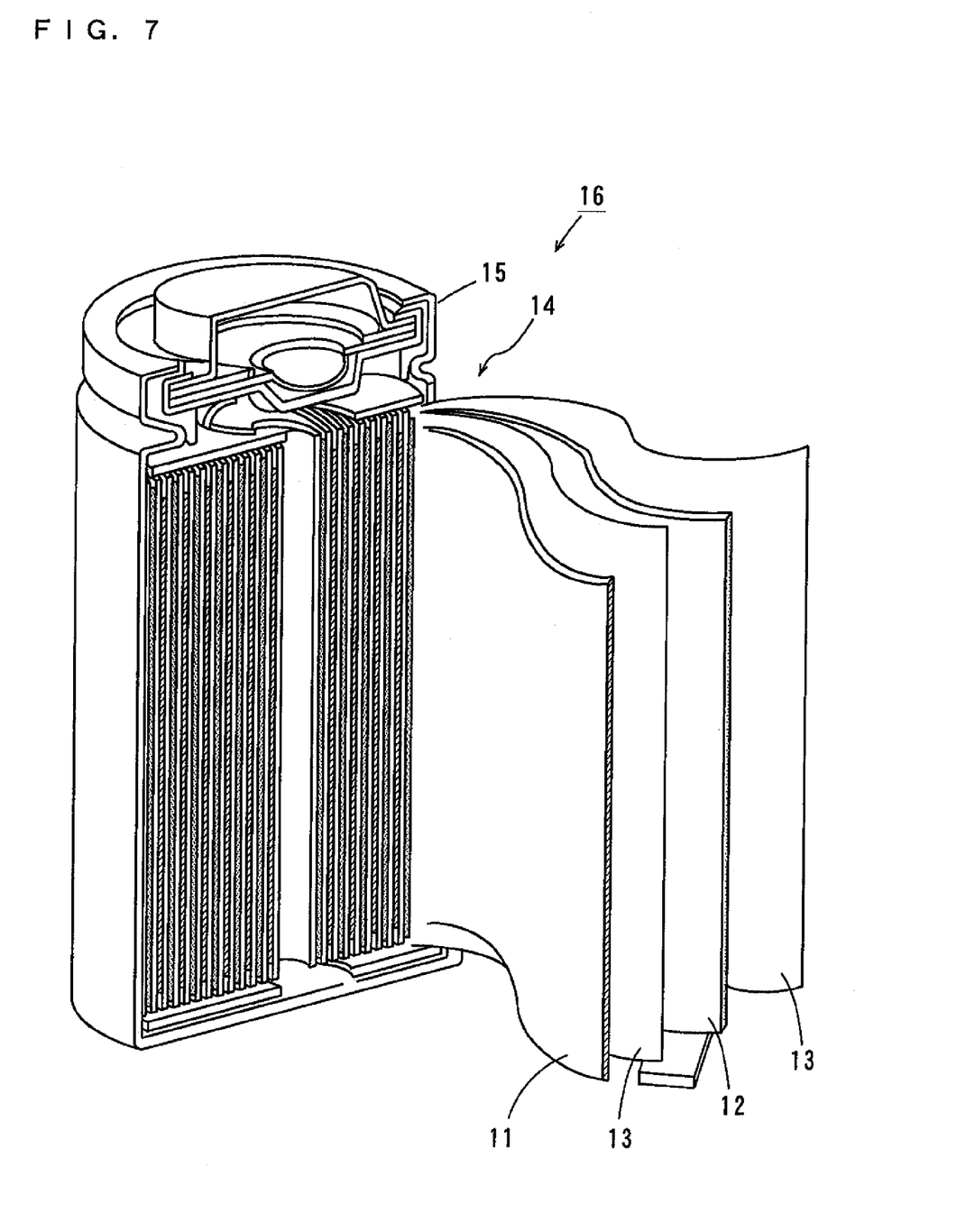
FIG. 7 is a partially cutaway perspective view of a wind test cell.

FIG. 7 is a partially cutaway perspective view of a wind test cell used in the inventive example 3. As shown in FIG. 7, the fabricated positive electrode 11 and negative electrode 12 were opposite to each other with a separator 13 made of polyethylene sandwiched therebetween to be wound along a longitudinal direction, so that a wind electrode body 14 was fabricated. Then, the wind electrode body 14 was housed in a laminate vessel 15 having a substantially cylindrical shape, and the nonaqueous electrolyte was poured into the laminate vessel. Thus, the wind test cell 16 was completed.

(c-4) Test

Figure 8:
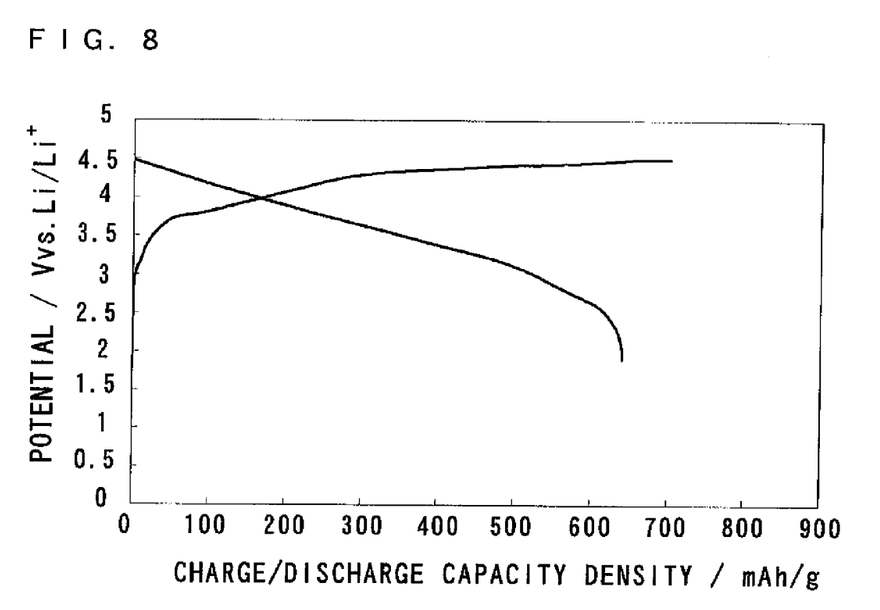
FIG. 8 is a diagram showing a result of the charge-discharge test of the wind test cell.

The charge-discharge test was performed using the wind test cell 16 fabricated in the foregoing manner. Note that the charge-discharge range was 4.5-1.9 V (vs. Li/Li$^+$). The charge was performed at 1/25 lt until 4.5 V, and then at a constant voltage of 4.5 V with a charge termination current at 3 mA. The discharge was performed at 1/25 lt. The result is shown in FIG. 8. As shown in FIG. 8, the charge-discharge test resulted in the initial discharge capacity density of 641 mAh and the initial charge-discharge efficiency of 91%.

Figure 9:
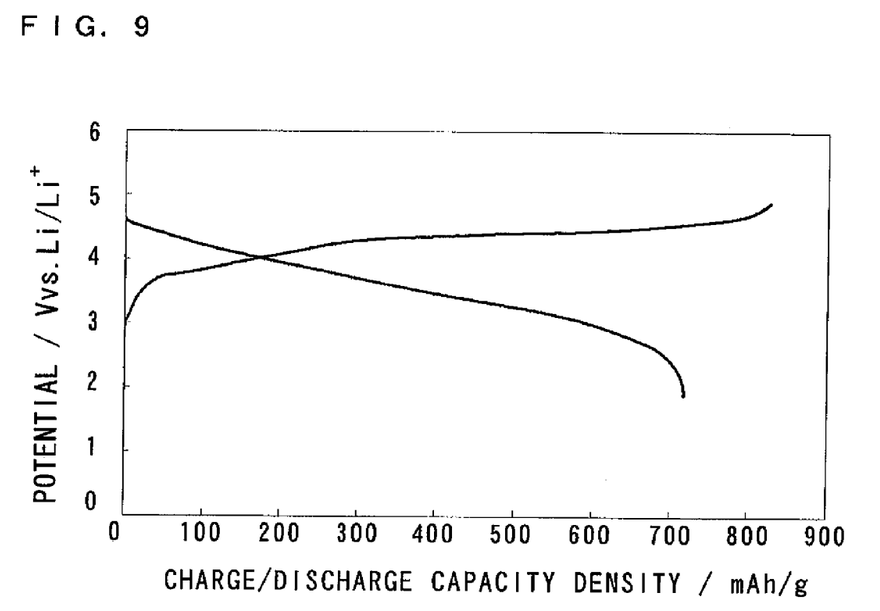
FIG. 9 is a diagram showing a result of the charge-discharge test of the wind test cell.

Next, the charge was performed at a constant current of 1/25 lt until 4.9 V, and the discharge was then performed until 1.9 V. The result is shown in FIG. 9. In this case, the initial discharge capacity density was 718 mA, and the initial charge-discharge efficiency was 87% as shown in FIG. 9.

In addition, a power cycle test was performed using the foregoing wind test cell 16. Note that the charge-discharge range was 4.5-1.9 V (vs. Li/Li$^+$). The charge was performed at 1/20 lt until 4.5 V, and then at the constant voltage of 4.5 V with the charge termination current at 3 mA. The discharge was sequentially performed at current densities of 2 lt, 1 lt, 1/2 lt, 1/5 lt, 1/10 lt and 1/20 lt, and a 10-minute interval was provided for each discharge. The thickness of the positive electrode was 50 μm.

As comparative examples, the similar power cycle test was performed to the test cell (see FIG. 1) using the test sample A as the positive electrode active material and to the test cell using the test sample B as the positive electrode active material. Note that lithium metal was used as the counter electrode of the test cell. The thickness of the positive electrode of the test cell using the test sample A was 28 μm, and the thickness of the positive electrode of the test cell using the test sample B was 20 μm.

Figure 10:
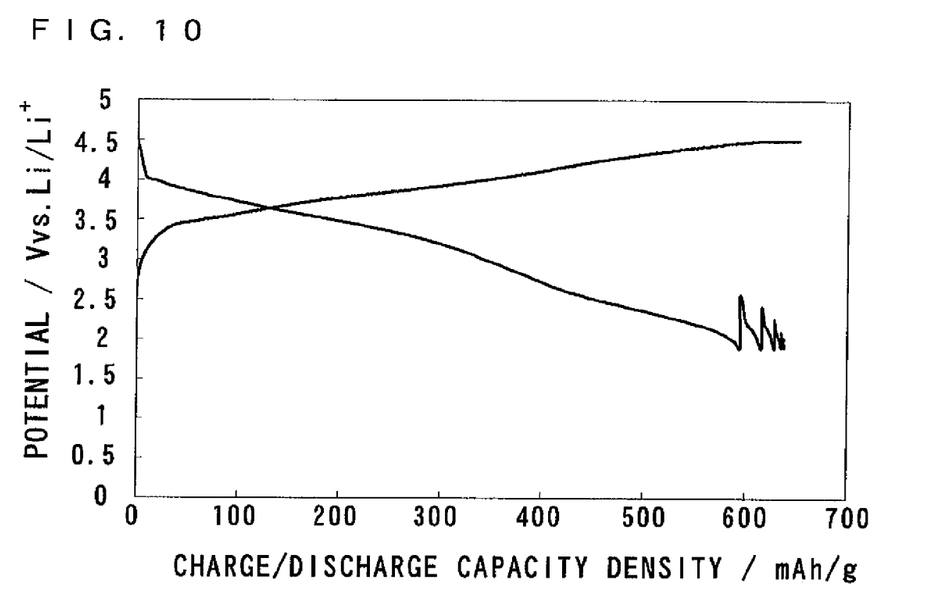
FIG. 10 is a diagram showing a result of a power cycle test of the wind test cell.

FIG. 10 shows the result of the power cycle test using the wind test cell 16 of this example. Moreover, Table 5 shows magnitudes of the discharge capacity density for each discharge in the wind test cell 16 of this example and the test cells of the comparative examples. In Table 5, the magnitude of the discharge capacity density when the discharge was performed at the current density of 1/20 lt is 100%, and the magnitude of the discharge capacity density for each discharge is expressed in percentage.

TABLE 5

| CURRENT DENSITY | TEST SAMPLE A | TEST SAMPLE B | TEST SAMPLE A + TEST SAMPLE B |
| --- | --- | --- | --- |
| 2 lt | 66.1 | 86.7 | 93.3 |
| 1 lt | 74.7 | 90.5 | 96.6 |
| 0.5 lt | 81.7 | 92.9 | 98.6 |
| 0.2 lt | 89.6 | 95.9 | 99.5 |
| 0.1 lt | 95.0 | 98.3 | 99.8 |
| 0.05 lt | 100.0 | 100.0 | 100.0 |

As can be seen from FIG. 10 and Table 5, while a large discharge capacity density cannot be obtained at a high current density when the test sample A or the test sample B was separately used, the large discharge capacity density can be obtained at the high current density when the test sample A or the test sample B was mixed to be used.

(d) Inventive Example 4

DSC (Differential Scanning Calorimetry) was performed to a test sample in which the foregoing test sample A and test sample B were mixed at 50:50 (weight %)(hereinafter referred to as a test sample C) and to a test sample in which the test sample A and test sample B were mixed at 40:60 (weight %)(hereinafter referred to as a test sample M.

The measurement was performed in the following condition. First, test cells were fabricated using the test sample C and the test sample D, respectively, as the positive electrode active materials. Then, the fabricated test cells were charged until 5.0 V (vs. Li/Li$^+$), and subsequently disassembled in an argon dry box.

Then, the positive electrodes of the test cells were washed with dimethyl carbonate, and 3 mg of ethylene carbonate and 5 mg of the positive electrode active material were extracted from each of the washed positive electrodes. The extracted ethylene carbonate and positive electrode active material were sealed in respective cells made of pressure-proof stainless steel for DSC, and heated to 300° C. at 5° C./min.

As comparative examples, DSC was similarly performed to the test sample A and the test sample B.

Figure 11:
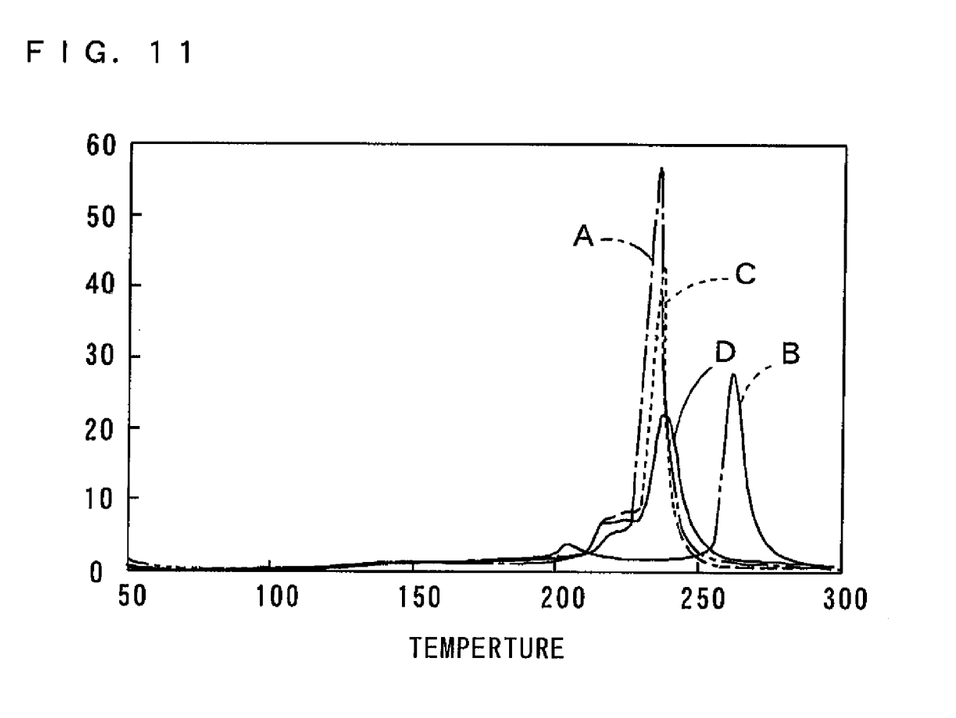
FIG. 11 is a diagram showing results of DSC of test samples A to D.

FIG. 11 shows the result of DSC for each test sample. As shown in FIG. 11, temperatures at peaks of the test sample C and the test sample D were higher than a temperature at the peak of the test sample A. This shows that improved safety of the nonaqueous electrolyte secondary battery can be achieved when the test sample A and the test sample B were mixed to be used, as compared with the case where the test sample A was separately used. Meanwhile, the temperatures at the peaks of the test sample C and the test sample D were lower than a temperature at the peak of the test sample B. Note that when the test sample B was separately used, performance of the nonaqueous electrolyte secondary battery is significantly decreased.

Accordingly, it was found that better performance of the nonaqueous electrolyte secondary battery was obtained while the level of safety was improved when the test sample A and the test sample B were mixed to be used. Moreover, the improved safety was achieved when the test sample A and the test sample B were mixed at 50:50 (weight %) to be used, as compared with the case where the test sample A and the test sample B were mixed at 40:60 (weight %) to be used.

INDUSTRIAL APPLICABILITY

A nonaqueous electrolyte secondary battery according to the present invention may be applied as various power supplies such as a portable power supply and an automotive power supply.

The invention claimed is:

1. A nonaqueous electrolyte secondary battery comprising a positive electrode including a positive electrode active material, a negative electrode, and a nonaqueous electrolyte including lithium ions, wherein
said positive electrode active material includes
a first layered oxide whose initial charge-discharge efficiency when lithium metal is used for a counter electrode is less than 100%, and
a second layered oxide that contains at least one of sodium and lithium, and whose initial charge-discharge efficiency when lithium metal is used for the counter electrode is 100% or more.

2. The nonaqueous electrolyte secondary battery according to claim 1, wherein
said first layered oxide includes $Li_{1+a}Mn_xCo_yNi_zO_2$,
said a is larger than 0 and smaller than 0.34, said x, y and z are each not less than 0 and smaller than 1, and said a+x+y+z is not less than 0.95 and not more than 1.05.

3. The nonaqueous electrolyte secondary battery according to claim 1, wherein
said second layered oxide includes $Li_ANa_BMn_XCo_YNi_ZO_2$,
said A is not less than 0 and not more than 0.22, said B is not less than 0.6 and not more than 0.8, said X, Y and Z are each not less than 0 and not more than 1, and said X+Y+Z is not less than 0.95 and not more than 1.05.

4. The nonaqueous electrolyte secondary battery according to claim 1, wherein
said second layered oxide includes a sodium oxide having a P2 structure belonging to a space group P6$_3$/mmc.

5. The nonaqueous electrolyte secondary battery according to claim 1, wherein
said second layered oxide includes $Li_{A+\alpha}Na_{B-\alpha}Mn_XCo_YNi_ZO_2$ produced through ion exchange of part of sodium in $Li_ANa_BMn_XCo_YNi_ZO_2$ for lithium, and
said A is not less than 0 and not more than 0.22, said B is not less than 0.6 and not more than 0.8, said X, Y and Z are each not less than 0 and not more than 1, said X+Y+Z is not less than 0.95 and not more than 1.05, and said $\alpha$ is larger than 0 and not more than said B.

6. The nonaqueous electrolyte secondary battery according to claim 5, wherein said $Li_{A+\alpha}Na_{B-\alpha}Mn_XCo_YNi_ZO_2$ belongs to a space group P6$_3$mc.

7. The nonaqueous electrolyte secondary battery according to claim 1, characterized in that
said second layered oxide includes at a ratio of less than 30 mol % $Li_{1+C}[Mn_DCo_{1-D}]_{1-C}O_2$ belonging to a space group C2/m or C2/c as a solid solution or a composite oxide, and
said C is not less than 0 and not more than ⅓, and said D is larger than 0 and not more than 1.

8. The nonaqueous electrolyte secondary battery according to claim 1, wherein
said negative electrode includes at least one selected from a group composed of lithium metal, silicon, carbon, tin, germanium, aluminum, lead, indium, gallium, a lithium containing alloy, a carbon material in which lithium is previously stored, and a silicon material in which lithium is previously stored.

9. A method of manufacturing a nonaqueous electrolyte secondary battery, comprising the steps of:
fabricating a positive electrode including a positive electrode active material;
fabricating a negative electrode; and
forming a nonaqueous electrolyte including lithium ions, wherein
said step of fabricating the positive electrode includes the steps of
producing a first layered oxide whose initial charge-discharge efficiency when lithium metal is used for a counter electrode is less than 100%,
producing a second layered oxide that contains at least one of sodium and lithium, and whose initial charge-discharge efficiency when lithium metal is used for the counter electrode is 100% or more, and
forming said positive electrode active material by mixing said first layered oxide and said second layered oxide.

10. The method of manufacturing the nonaqueous electrolyte secondary battery according to claim 7, wherein said step of producing the second layered oxide includes the step of producing said second layered oxide through ion replacement of part of sodium in a sodium oxide with lithium.

* * * * *